United States Patent
Sekar

(10) Patent No.: US 12,282,758 B2
(45) Date of Patent: Apr. 22, 2025

(54) CUSTOMIZABLE CONTAINERIZATION FRAMEWORK SYSTEM AND METHOD

(71) Applicant: OPEN TEXT HOLDINGS, INC., Menlo Park, CA (US)

(72) Inventor: Dhatchana Moorthy Sekar, Bangalore (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 43 days.

(21) Appl. No.: 18/151,271

(22) Filed: Jan. 6, 2023

(65) Prior Publication Data
US 2024/0231785 A1  Jul. 11, 2024

(51) Int. Cl.
G06F 8/60 (2018.01)
G06F 9/455 (2018.01)

(52) U.S. Cl.
CPC ............ *G06F 8/60* (2013.01); *G06F 9/45558* (2013.01); *G06F 2009/45562* (2013.01)

(58) Field of Classification Search
CPC ................... G06F 8/60; G06F 9/45558; G06F 2009/455562
(Continued)

(56) References Cited

U.S. PATENT DOCUMENTS 9,195,393 B1 * 11/2015 Li .......................... G06F 3/0643
9,800,517 B1 * 10/2017 Anderson ........... H04L 63/0428
(Continued)

FOREIGN PATENT DOCUMENTS

CN   112181587 A   1/2021
CN   111158737 B   1/2024

OTHER PUBLICATIONS

Gholami, et al, "A Framework for Satisfying the Performance Requirements of Containerized Software Systems Through Multi-Versioning", ACM, pp. 150-160 (Year: 2020).*
(Continued)

*Primary Examiner* — Anil Khatri
(74) *Attorney, Agent, or Firm* — SPRINKLE IP LAW GROUP

(57) ABSTRACT

Systems and methods for containerization are provided. Various embodiments provide containerization systems and methods that The method includes deploying an initial container image associated with a startup script, a pre-service script and post-service script. This deployment Further, the method includes executing the startup script associated with the initial container image, and the executing including copying configuration information for the initial container image into a volume and generating a marker file for the initial container image. The containerization systems and methods The method also includes deploying a main container image associated with a startup script. This deployment The method also includes executing the startup script associated with the main container image and copying the configuration information from the volume to a local system. This deployment alse Additionally, the method includes executing the main container, including executing the pre-service script associated with the initial container image, configuring the main container, executing a main service, and executing the post-service script associated with the initial container image.

18 Claims, 7 Drawing Sheets

FIG. 6A

(58) Field of Classification Search
USPC .................................. 717/168–174, 105–121
See application file for complete search history.

(56) References Cited

U.S. PATENT DOCUMENTS

| | | | |
|---|---|---|---|
| 10,169,209 B2 | 1/2019 | McPherson | |
| 10,291,706 B1 * | 5/2019 | Zhao | H04L 67/1097 |
| 10,404,474 B1 * | 9/2019 | Caceres | H04L 9/3268 |
| 10,810,003 B2 * | 10/2020 | Gainsborough | G06F 8/65 |
| 10,873,592 B1 * | 12/2020 | Singh | H04L 67/535 |
| 10,877,739 B1 * | 12/2020 | Fernandez | G06F 9/455 |
| 10,922,090 B1 * | 2/2021 | Lieberman | G06F 9/455 |
| 11,099,882 B2 * | 8/2021 | Rupprecht | G06F 9/45545 |
| 11,106,455 B2 | 8/2021 | Myers | |
| 11,201,955 B1 * | 12/2021 | Sachdeva | H04L 67/535 |
| 11,307,839 B2 | 4/2022 | Vaddi | |
| 11,573,814 B1 * | 2/2023 | Aithal | G06F 16/188 |
| 11,579,867 B1 * | 2/2023 | Punathil | G06F 8/65 |
| 11,698,759 B2 * | 7/2023 | Israni | G06F 3/0631 711/112 |
| 11,726,764 B2 * | 8/2023 | Joshi | G06F 21/6218 717/169 |
| 11,762,850 B2 * | 9/2023 | Rupprecht | H04L 67/1097 707/769 |
| 11,868,769 B1 * | 1/2024 | Dongaonkar | G06F 9/5072 |
| 11,893,382 B2 * | 2/2024 | Tarocchi | G06F 9/45558 |
| 11,954,474 B2 * | 4/2024 | Sree Prakash | G06V 10/82 |
| 11,960,870 B2 | 4/2024 | Li | |
| 11,989,586 B1 * | 5/2024 | Srikanta | G06F 9/5083 |
| 12,020,016 B2 | 6/2024 | Chibon | |
| 12,039,321 B2 | 7/2024 | Sui | |
| 12,050,690 B2 * | 7/2024 | Sivaswamy | G06F 9/54 |
| 12,056,511 B2 * | 8/2024 | Tarasov | G06F 16/188 |
| 12,126,643 B1 * | 10/2024 | Skarphedinsson | G06F 9/455 |
| 2005/0044543 A1 * | 2/2005 | Thomas | G06F 9/445 714/E11.026 |
| 2017/0068676 A1 | 3/2017 | Jayachandran | |
| 2017/0147335 A1 | 5/2017 | Parees | |
| 2017/0300311 A1 | 10/2017 | Vasquez Lopez | |
| 2018/0088926 A1 | 3/2018 | Abrams | |
| 2018/0095973 A1 | 4/2018 | Huang | |
| 2018/0341471 A1 | 11/2018 | Stefanov | |
| 2019/0235897 A1 | 8/2019 | Goel | |
| 2019/0354389 A1 | 11/2019 | Du | |
| 2020/0241867 A1 | 7/2020 | Gainsborough | |
| 2020/0272427 A1 | 8/2020 | Wang | |
| 2020/0310775 A1 | 10/2020 | Nyamars | |
| 2022/0308861 A1 | 9/2022 | Franckiewicz | |
| 2023/0087544 A1 | 3/2023 | Duvur | |
| 2023/0244466 A1 | 8/2023 | Shah | |
| 2024/0184558 A1 | 6/2024 | Chen | |
| 2024/0231797 A1 | 7/2024 | Sekar | |

OTHER PUBLICATIONS

Song et al, "Towards Transparent and Stealthy Android OS Sandboxing via Customizable Container-Based Virtualization", ACM, pp. 2858-2874 (Year: 2021).*

Kang et al, "Container and Microservice Driven Design for Cloud Infrastructure DevOps", IEEE, pp. 202-211 (Year: 2016).*

Zhao et al, "Large-Scale Analysis of Docker Images and Performance Implications for Container Storage Systems", IEEE, pp. 918-930 (Year: 2021).*

Poggiani et al, "Live Migration of Multi-Container Kubernetes Pods in Multi-Cluster Serverless Edge Systems", ACM, pp. 9-16 (Year: 2024).*

Morales et al, "Insights on Implementing a Metrics Baseline for Post-Deployment AI Container Monitoring", ACM, pp. 46-55 (Year: 2024).*

Cai et al, "Improving Resource Usages of Containers Through Auto-Tuning Container Resource Parameters", IEEE, pp. 1-12 (Year: 2019).*

Office Action issued by the U.S. Patent and Trademark Office for U.S. Appl. No. 18/151,273, mailed Oct. 21, 2024, 16 pages.

* cited by examiner

CUSTOMIZABLE CONTAINERIZATION FRAMEWORK SYSTEM AND METHOD

TECHNICAL FIELD

This disclosure relates generally to the field of content management. In particular, this disclosure relates to systems, methods, and computer program products for providing a customizable containerization pipeline framework for modifying and deploying containers in a container orchestration cloud environment.

BACKGROUND

Containerization relates to an application-level virtualization over multiple network resources enabling software applications to run in isolated user spaces called containers in a cloud or non-cloud environment. In some examples, containers are basically fully functional and portable cloud or non-cloud computing environments surrounding an application and keeping the application independent from other parallel environments. In some uses, each container simulates a different software application and runs isolated processes by bundling related configuration files, libraries and dependencies. Container deployment is the act of deploying containers to their target environment, such as a cloud or on-premises server.

In the context of a conventional docker approach to containerization, several problems exist when updating or modifying containers. For example, in some systems, customization on a docker image is typically accomplished by creating another image using a dockerfile and a docker build command. In a typical environment, there are multiple customization layers. Providing a fix at one layer then requires images to be built across other layers. In other words, modifying one layer requires rebuilding again from a base to that layer, which is time consuming, among other disadvantages.

In view of the foregoing, there is room for innovations and improvements for providing customization, release management, and maintenance in a container orchestration environment.

SUMMARY

In some embodiments, containerization systems and methods are described that deploying an initial container image associated with a startup script, a pre-service script and post-service script, this deployment including executing the startup script associated with the initial container image, and the executing including copying configuration information for the initial container image into a volume and generating a marker file for the initial container image. A main container image associated with a startup script is then deployed, this deployment includes executing the startup script associated with the main container image, and copying the configuration information from the volume to a local system. The exemplary method also includes executing the main container, including executing the pre-service script associated with the initial container image, configuring the main container, executing a main service, and executing the post-service script associated with the initial container image.

Embodiments of the present invention also include computer-readable storage media containing sets of instructions to cause one or more processors to perform the methods, variations of the methods, and other operations described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 6 is split in the drawings into FIGS. 6A/6B.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

For the purposes of this description, it may be helpful to provide some definitions to terms that may be used in the description. "Custom scripts and binaries" refer to scripts and binaries that contain customization over an application image. For example, the description may refer to hook script, installer, jar and dar files, etc. "Init Container Image" refers to an (initial) image that contains custom scripts and binaries which is maintained by a customization team. "Custom Script PVC" refers to persistent volume client (PVC) where all the custom scripts and binaries will be copied (described below). "Startup Script" refers to an image startup script that copies custom scripts and binaries from an image to a custom script PVC. "Hook Script" refers to a script that will be called by an application (e.g., a content server) passing the argument prehook and posthook. The hook script may be in the format *deploy.sh and will be executed in alphabetical order, sin some examples. "Marker Files"-when the copying is done by a startup script, it should create the marker files and the marker file names to be passed as arguments to the helm chart (e.g., the CS Helm chart referenced below). The marker file is also used to identify the restart scenario (described below). Note that in the approaches described below, custom scripts and binaries are copied from PVC to a local file system before being executed. This avoids permission issues in environments like root squash.

Figure 1:
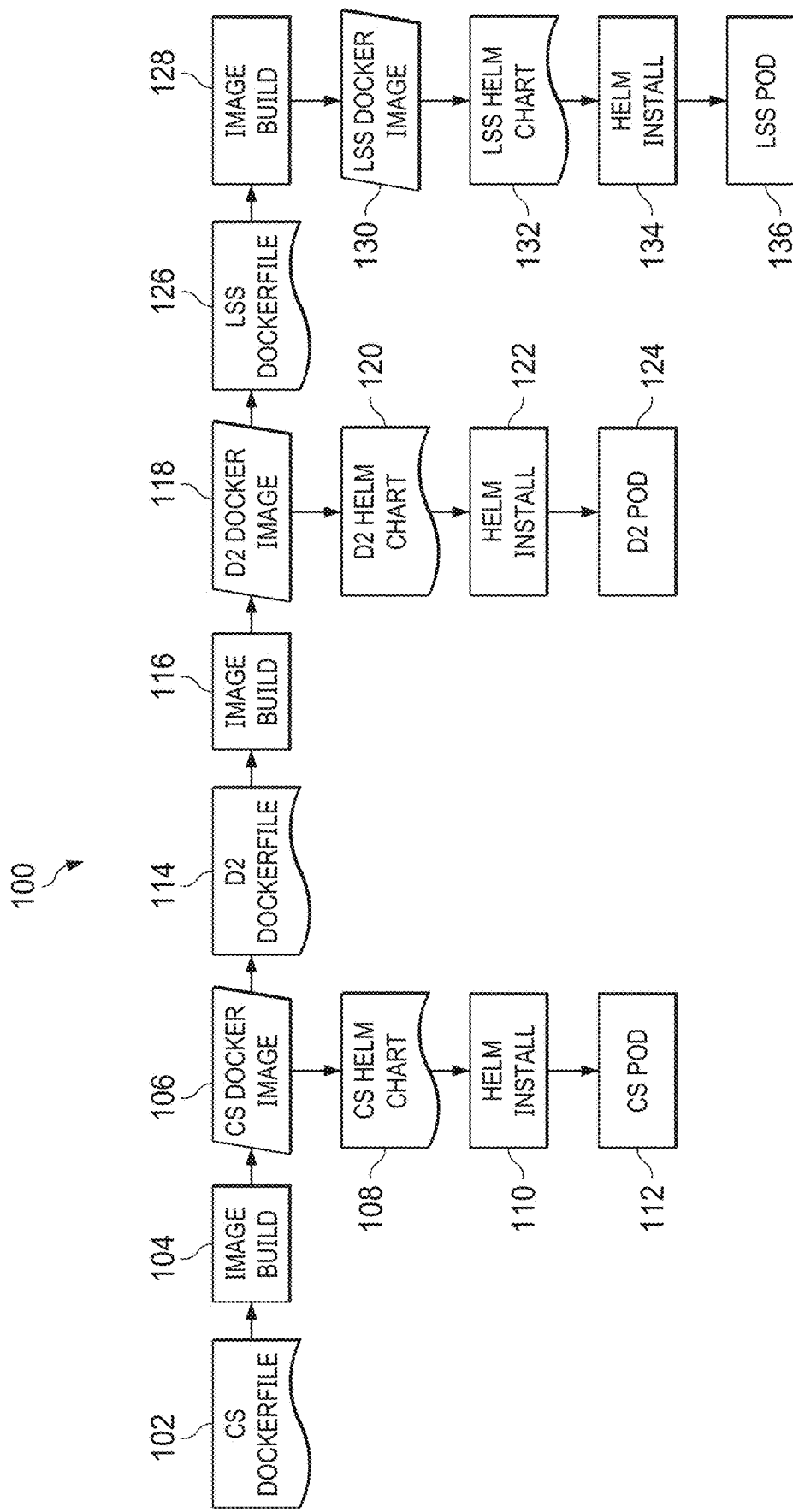
FIG. 1 depicts a conventional approach to container deployment.

FIG. 1 depicts a diagram of a conventional Docker approach 100 to container deployment. The following examples are described in the context of a containerization deployment in a content server (CS) environment. Other contexts are also possible, as one skilled in the art would understand. The following examples are also described in the context of specific container providers (e.g., Docker), although other providers (e.g., Amazon Web Services, Linux Containers, Java Containers, Hyper-V Containers, Windows Server Containers, etc.) may also be used to implement the examples. Similarly, various applications could be used for packaging and deploying container applications (e.g., Helm), as one skilled in the art would understand. In this example, a content server Dockerfile 102 (CS Dockerfile, for a content server) of a first layer goes into an image build process 104 to build a Docker image 106 (CS Docker Image). From that, teams have to maintain separately the CS Helm Chart 108, the helm install process 110, and the CS Pod 112 (a container), and so on. As an example, the content server may provide a platform for another client application (D2). In a second layer, the client application D2 Dockerfile 114 goes through the same process. In this example, the D2 Dockerfile 114 goes into an image build process 104 to build a Docker image 118 (D2 Docker Image). From that, teams have to maintain separately the D2 Helm Chart 120, the helm install process 122, and the D2 Pod 124, and so on. In a similar process an LSS Dockerfile 126 goes into an image build process 128 to build a Docker image 130 (LSS Docker Image). Next, LSS Helm chart 132 is used for the Helm install process 134 to develop the final LSS pod 136. Note that the LSS pod 136 contains the other pods 112 and 124. As discussed above, providing a modification or fix at one layer requires images to be built across the other layers, since steps such as 114, 126 depend from previous steps, resulting in numerous disadvantages, as one skilled in the art would understand.

Figure 2:
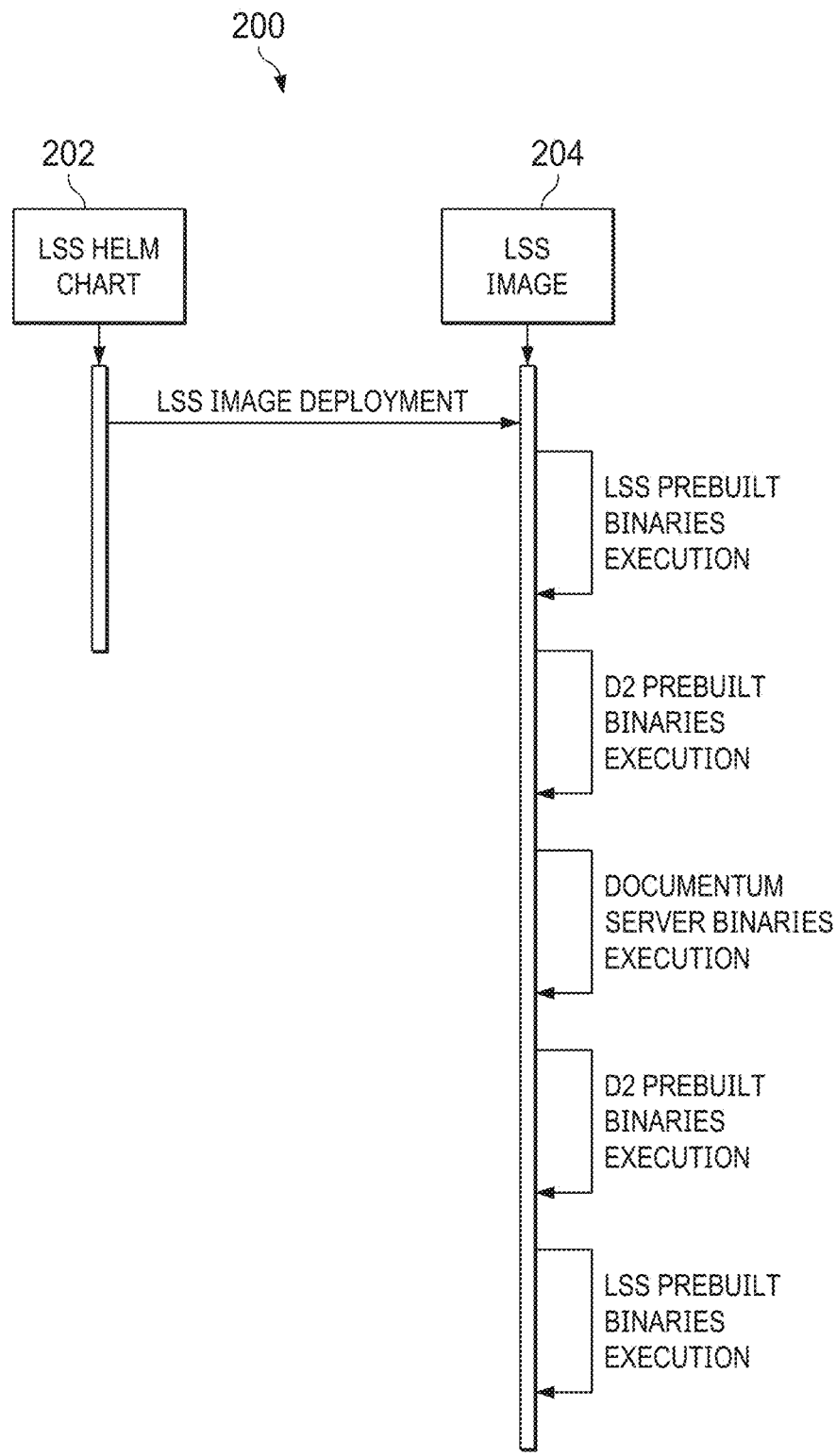
FIG. 2 depicts a sequence diagram for container deployment using the approach of FIG. 1.

FIG. 2 is a sequence diagram for a single container script relating to conventional Docker approach discussed above with respect to FIG. 1. In this example, everything is prebuilt. FIG. 2 show LSS Helm chart 202 and the LSS image deployment (of LSS image 204). A first prebuilt binary is executed, and sequentially the other prebuilt binaries are also sequentially executed (D2 prebuilt binaries, Documentum prebuilt binaries, LSS prebuilt binaries).

Figure 3:
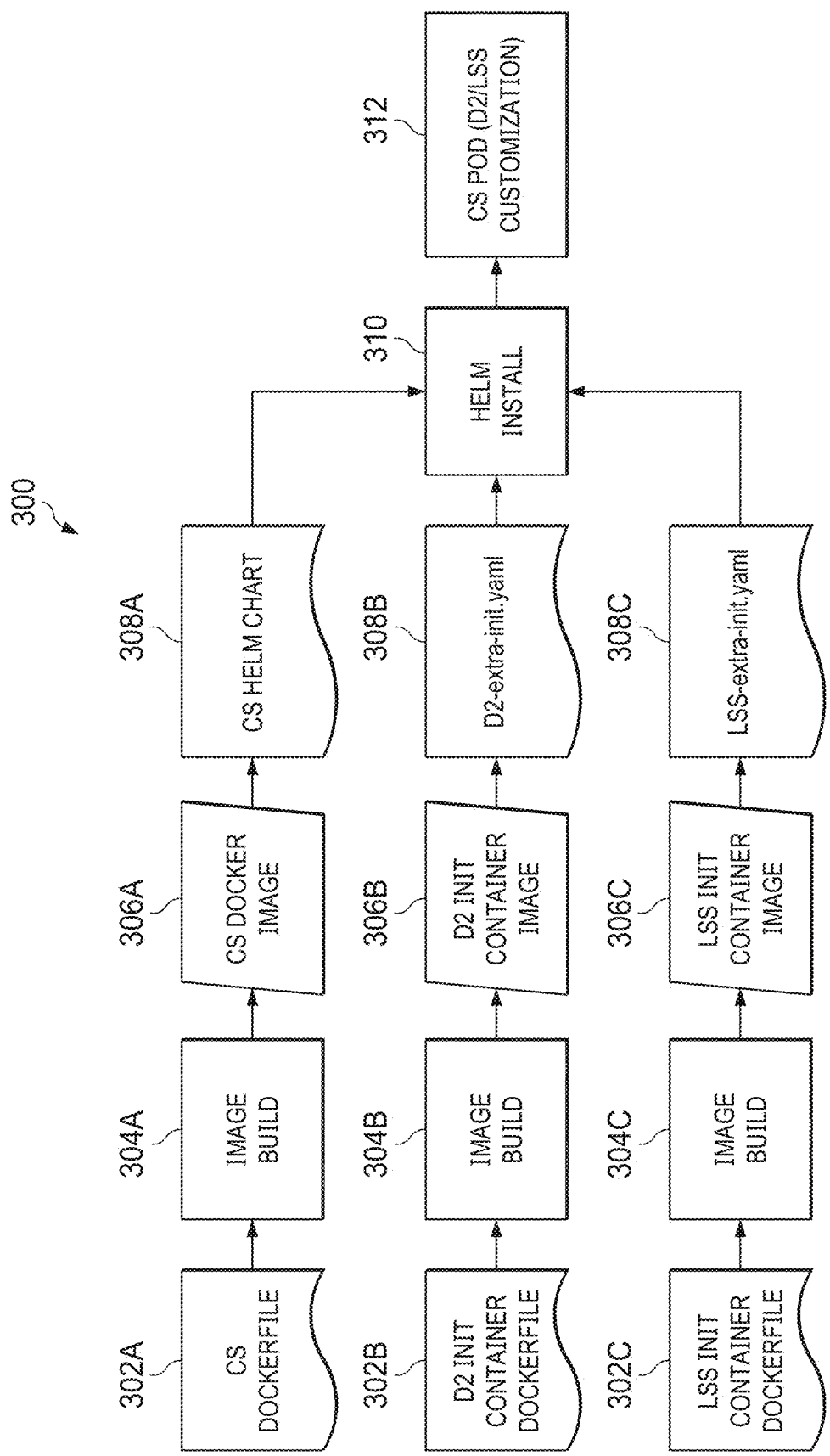
FIG. 3 depicts an improved approach to container deployment.

FIG. 3 depicts an improved approach to container deployment. Generally, with the container deployment process 300 shown in FIG. 3, building a container image in one layer is not affected in the same way (compared to the conventional approach of FIG. 1) when a change is made in another layer. In other words, each team associated with a given layer has their own build and maintenance process. At runtime, when the deployment happens, any customization of each layer will get into the ultimate container. FIG. 6 (described below) provides one example of a method of containerization that can be implemented using the approach depicted in FIG. 2. Other examples are also possible, as one skilled in the art would understand. More details of the process 300 of FIG. 3 are described below in conjunction with the sequence diagram of FIG. 5.

FIG. 3 shows CS Dockerfile 302A, for example, for a content server. The Dockerfile 302A goes to an image build process 304A to build a docker image 306A. From the docker image 306A, the CS Helm chart 308A is created. Similarly, a D2 init container Dockerfile 302B, for example, a client product. The Dockerfile 302B goes to an image build process 304B to build a D2 init container image 306B. At 308B, the yaml file(s) are configured, which will be called by the Helm install process. An LSS init container Dockerfile 302C, for example, a client product. The Dockerfile 302C goes to an image build process 304C to build an LSS init container image 306C. At 308C, the yaml file(s) are configured, which will be called by the Helm install process. The outputs of each layer (308A, 308B, 308C) are provided to the Helm Install process 310 to generate the final pod 312 (CS Pod (D2/LSS customization) in FIG. 3).

Before describing the sequence diagram relating to FIG. 3, a novel initial container (or initcontainer) approach will be discussed. Generally, initcontainers are containers which will be deployed before deploying an actual container. In some embodiments, initcontainers are be executed in order as it is configured in the chart. Initcontainers should be killed once their respective startup script is done executing. Hence, the startup script should not wait until the end like a typical script waits with respect to a normal container. A container customization team should maintain the following items: the Dockerfile (to build an initcontainer image), custom scripts and binaries (actual customizations), hook script (contains prehook and posthook method and its name ends with *deploy.sh, in some examples), startup script (copies the custom script and binaries in custom image to mounted PVC path). Each of these items are described in more detail below. A custom script PVC (dcs-data-pvc) will be provisioned by the CS chart itself. Marker files (described below) can be used only by the startup script and need not to be configured in the CS chart.

Figure 4:
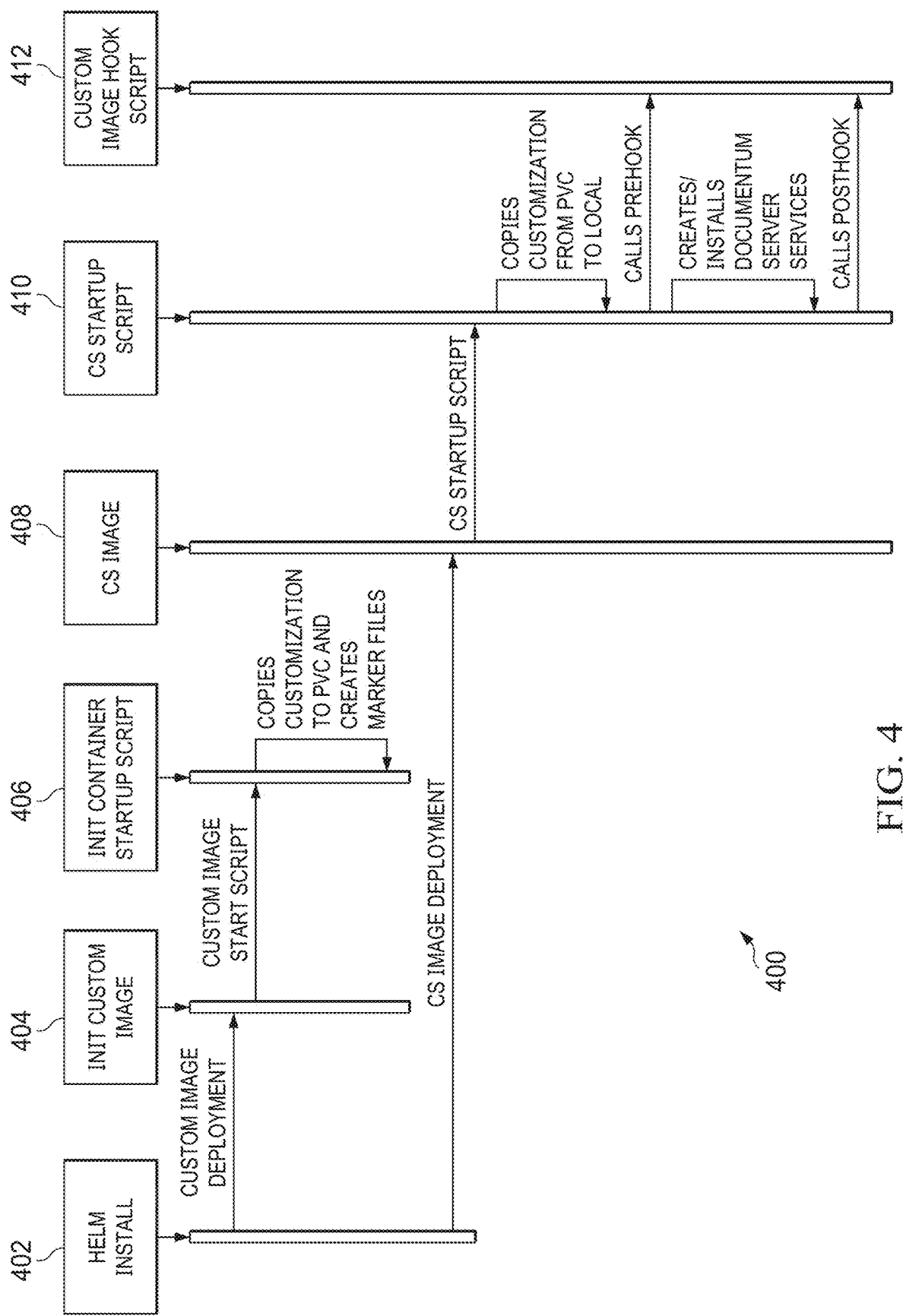
FIG. 4 depicts a sequence diagram for container deployment using an initial container approach.

FIG. 4 is a sequence diagram 400 illustrating an exemplary set of steps used to deploy a container using the initcontainer approach discussed above. Note that FIG. 4 shows a sequence diagram for a single layer. A multi-layer sequence diagram will be discussed below. A helm install command 402 is shown for deploying a custom image. The helm install command also passes the extrainit and extraevn yaml files (discussed below). Following are two example commands:

```
helm install <release_name> <location where Helm charts are extracted>/dctm-server
--namespace <name of namespace> -f custom-extrainit.yaml -f custom-extraenv.yaml
helm install dctm-server /opt/temp/Helm-charts/dctm-server --namespace docu -f custom-extrainit.yaml -f custom-extraenv.yaml
```

Following are sample custom-extrainit.yaml commands for calling the yaml files:

```
#custom-values.yaml
content-server:
    extraInitContainers:
#name of the init container. Arbitrary
- name: initimage1
    image: <initcontainer image>
    volumeMounts:
#name of the pvc is fixed. This is the pvc provided by Documentum
Server
#mountpath should be the folder to which the customizations copied in
startup script
#subpath is fixed. Here <sname> is the same as the <sname> in cs chart
    - name: dcs-data-pvc
      mountPath: /mountpath
      subPath: initcontainercustomscripts/<sname>dcs-pg
```

Following are sample custom-extrainit.yaml commands:

```
#custom-extraenv.yaml
content-server:
    extraEnv:
        - name: CUSTOM_ENV1
          value: "value1"
        - name: CUSTOM_ENV2
          value: "value2"
        - name: CUSTOM_ENV3
          value: "value3"
        - name: CUSTOM_ENV4
          value: "value4"
```

Other Helm commands may also be needed, for example, for installing a Helm chart for an underlying product. For example, for a Documentum server, a dctm-server chart.

A Dockerfile image (Init custom image 404 in FIG. 4) is deployed. In the example of a content server, a content server image is deployed. As shown in FIG. 4, a custom image start script is executed. Following is an example of commands for a sample Dockerfile:

```
FROM <base_os_image>
#creating directories for scripts and mount path in image
RUN mkdir /customization && \
    mkdir /mountpath
#copying scripts and customization into image
COPY 1deploy.sh /customization/
COPY <customization_files> /customization/
COPY startup.sh /
#Changing permission of executable scripts
RUN chmod +x /startup.sh
CMD /startup.sh
```

Next, the init container startup script 406 is executed. This script will copy customizations to PVC and creates marker files (described below). This step will be performed for every container image. Following are sample startup scripts:

```
#startup.sh
echo "In startup.sh of initcontainerimage"
#The mountpath '/mountpath' below should be configured as
extraInitContainers- >volumeMounts->mountPath in content-server
values.yaml
cp -Rf /customization/* /mountpath
touch -f customization-copied
```

Next, the main container (CS Image 408 in FIG. 4) will be deployed (for example, a content server). This step will initiate the content server (or other product) startup script (shown as "CS startup script" in FIG. 4). The startup script may come from the product and will be referenced by the product chart (e.g., dctm-server for a Documentum server).

The CS startup script 410 is executed and copies customizations from PVC to local storage. The script also calls the prehook and posthook scripts (illustrated by Custom Image Hook Script 412 in FIG. 4). The prehook script is executed before running the product services and provides certain default behavior. Before calling the posthook script, the script creates/installs the product services (e.g., Documentum Server services). Note that the prehook script is called at all restart scenarios. The posthook script is called only at the first deployment, or in upgrade scenarios.

Following are sample prehook and posthook scripts:

```
#In 1deploy.sh
echo "In 1deploy.sh of initcontainerimage. $ "
#Documentum server sends first argument to this script as 'prehook'
before starting any service and as 'posthook' after all the services started
If [ '$1' == 'prehook' ]
Then
# Calls custom scripts that needs to be executed before the core service
starts
Fi
If ['$1' == "posthook" ]
Then
#calls the executable after creating the core services
fi
```

Figure 5:
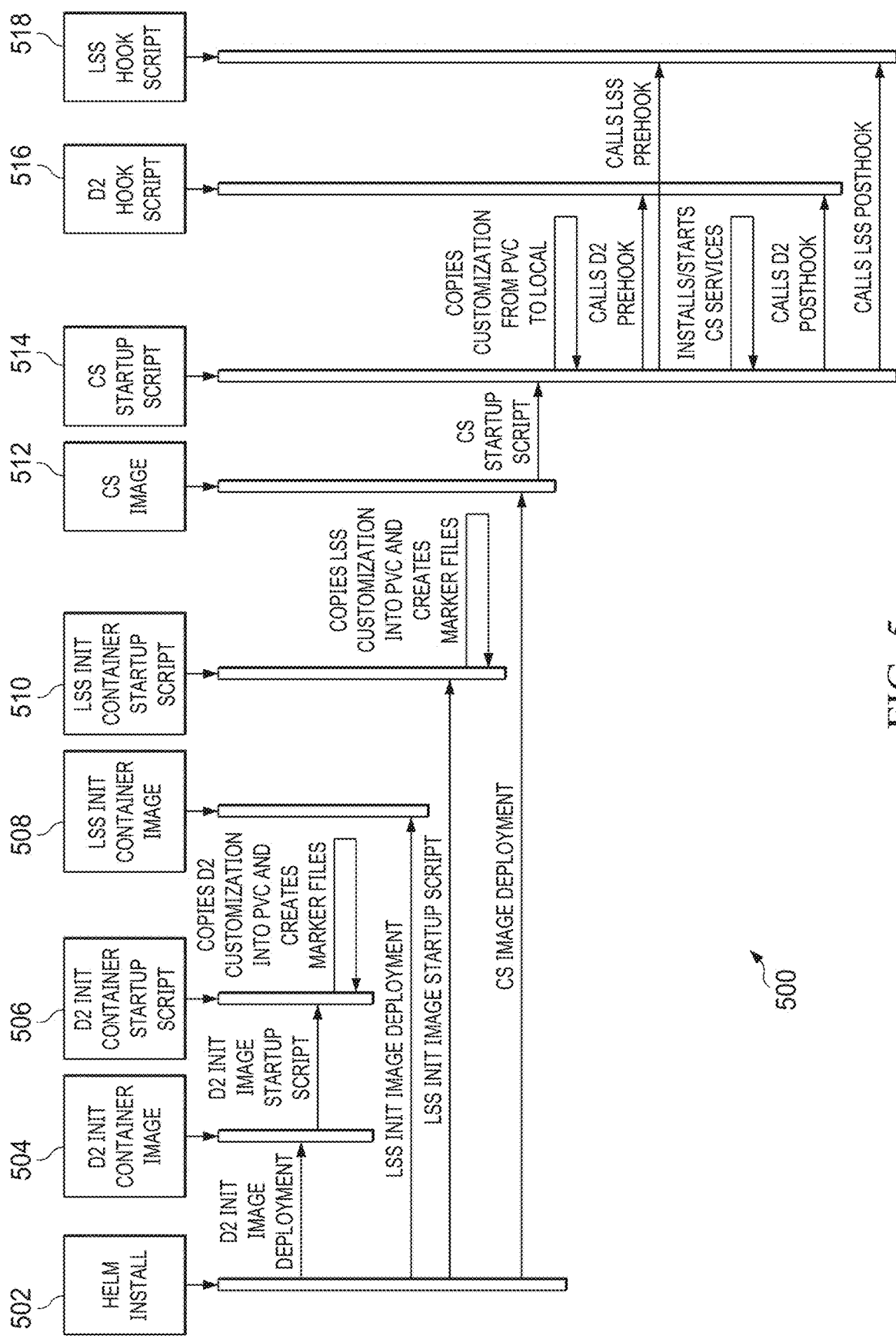
FIG. 5 depicts a sequence diagram for container deployment using the approach of FIG. 3.
Figure 6A:
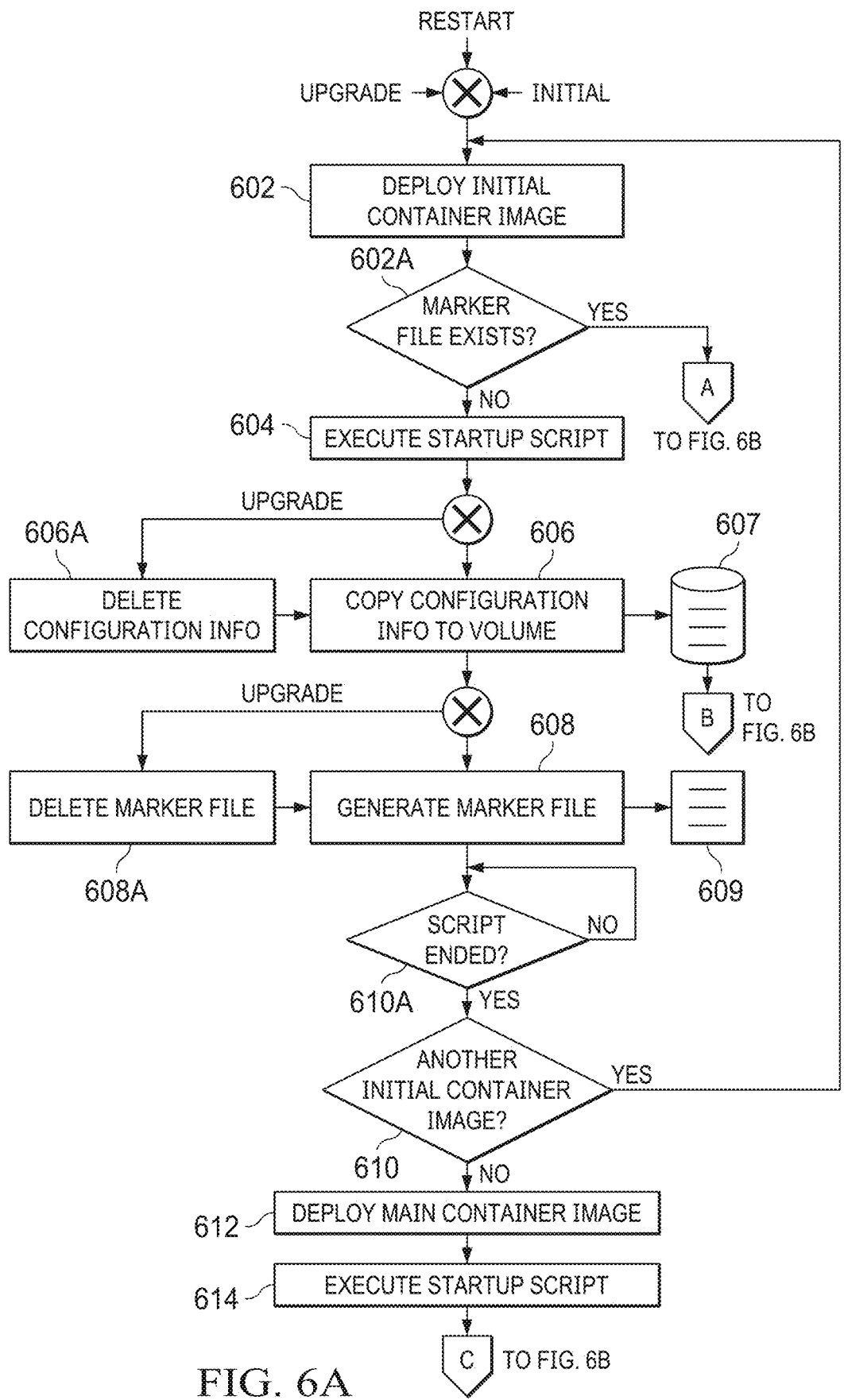
FIG. 6 depicts a flow chart of an example of a method of containerization.
Figure 6B:
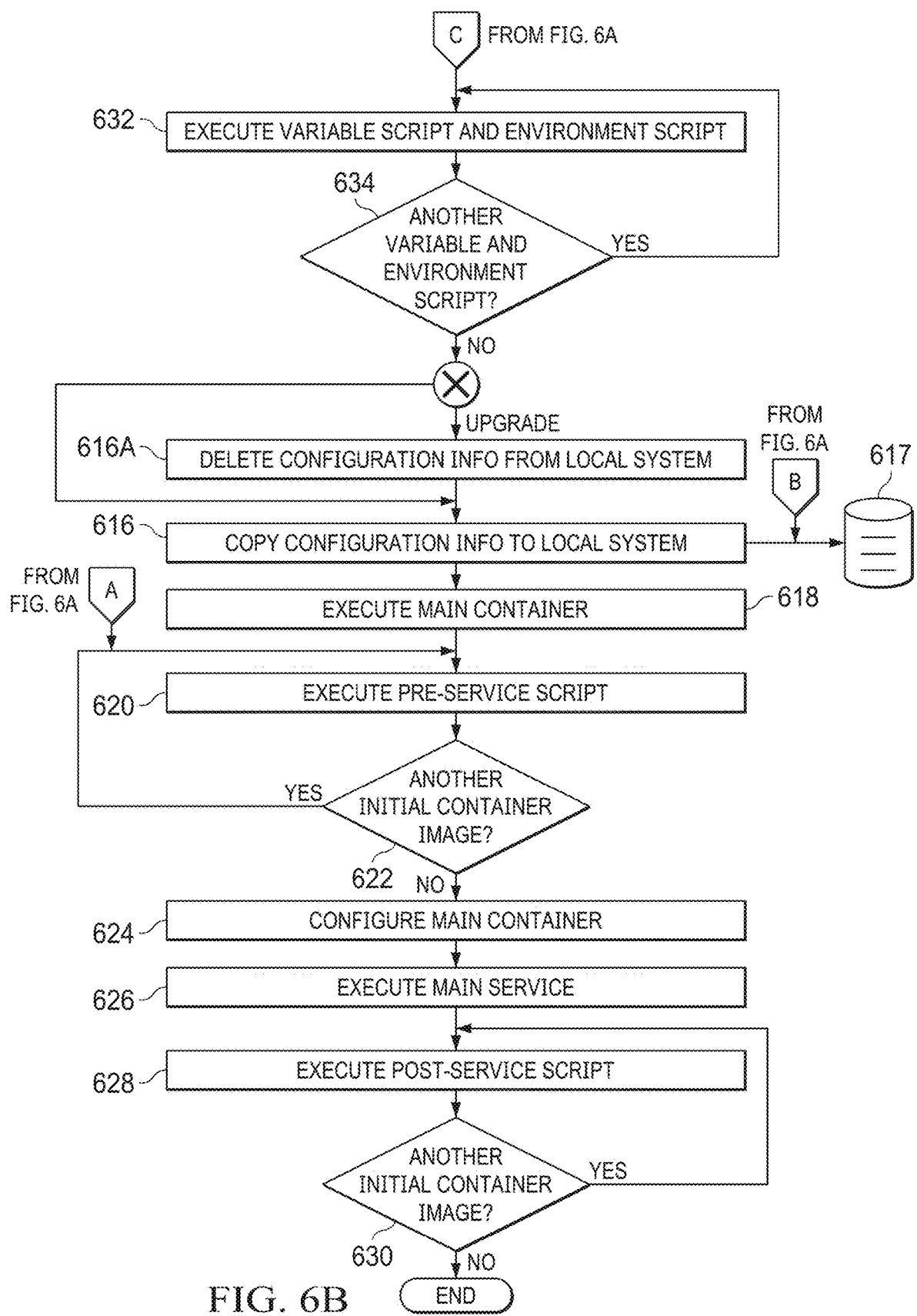

FIG. 5 is a sequence diagram 500 illustrating an exemplary set of steps used to deploy a multi-layer container (e.g., see FIG. 3) using the initcontainer approach discussed above. The process illustrated in FIG. 5 is similar to that shown in FIG. 4, but with multiple container images. Also note that the process illustrated in FIG. 5 will be better understood by referring to the containerization method illustrated in FIG. 6 (described below).

A helm install command 502 is shown for deploying custom images. As shown, this deploys init container images for D2 and LSS. When the D2 init container image 504 deploys, the D2 init image startup script 506 starts. The startup script 506 copies D2 customizations into PVC and creates marker files (described below). When the LSS init container image 508 deploys (after the script 506 has stopped), the LSS init image startup script 510 starts. The startup script 510 copies LSS customizations into PVC and creates marker files. The Helm install command 502 also deploys the main container CS image 512, but not until the startup script 510 has stopped. Note that the main container does not need an init container. Next, the CS startup script 514 executes, and copies customizations from PVC to local storage. The script 514 then calls the D2 prehook script and then the LSS prehook script. The prehook scripts are executed before installing/starting CS services. Next, the script 514 calls the D2 posthook script and then the LSS posthook script. As before, note that the prehook scripts are called at all restart scenarios. The posthook scripts are called only at the first deployment, or in upgrade scenarios.

In some embodiments, inventive systems, methods, and techniques are directed toward containerization involving multiple containers to deploy application services on virtual machines. A main container is based on one or more pre-built containers that are generated and incorporated into the main container image at time of deployment. The inventive subject matter solves existing, long felt problems that stem from building of multiple containers serially as well as container design, development, and management. In the existing art, if one of the containers is modified in the build series, then the containers built after the modified container must be re-built to incorporate the modifications.

Often, separate development teams are responsible for each container which they design, develop, and provide for integration. The inventive subject matter allows such teams to independently manage their own container and then provide for deployment, without concern for other containers that they previously depended on in the serial build chain. Moreover, the main container incorporates each container independently, without concern for whether a particular container needs to be re-built because another container has been modified.

In some embodiments, a deployment method involves deploying the pre-built containers (referred to hereinbelow as "initial container images") comprising, for each pre-built container, generating required variables and executing a script for configuration information and markup files. A deployment script is used to generate the required variables (including environment variables which must be defined to execute scripts further down the line in the deployment process) and call the scripts for the pre-built containers. Moreover, the pre-built container scripts generate configuration information for each pre-built container. The scripts copy the configuration information into a volume.

When deploying the main container, a main container script is called to copy the configuration information for the pre-built containers from the volume to a local system. Next, pre-service scripts are executed for the pre-built containers. Such pre-service scripts perform a variety of functions that need to be completed prior to executing the application service. A non-limiting example of a pre-service script includes reformatting and/or updating container binaries.

Once the pre-scripts are executed, the main container customization logic and core logic are configured, and the application service is started. Next, post-service scripts are executed for the pre-built containers. Such post-service scripts perform a variety of functions that need to be completed after the application service is started. In a non-limiting example, the application service is started, causing the creation of a database. If database tables need to be added to the database, it must be done in a post-service script after the application service creates the database so that tables may be added thereto.

The application service may be stopped and restarted, however, only a subset of the steps described above need to be performed (this assumes that none of the pre-built containers or the main container has changed). For example, the configuration information has already been copied from the volume to the local system and the post-service scripts have already been executed, so these steps need not be reperformed. However, the pre-service scripts may need to be re-executed as some of this information may have changed. In some embodiments, a restart of the application service is detectible by identifying marker files generated during the initial deployment. If the marker files exist, then it is known that the operation is not an initial start of the application service, but a restart.

The application service may further be upgraded, which is required when one or more of the pre-built containers are updated. Here, the previous version's configuration information and markup files are deleted and replaced with the upgraded version's configuration information and markup files. The updated configuration information is then copied to the local system. Furthermore, the pre-service and post-service scripts need to be re-executed, and the application stopped and restarted.

Referring now to FIG. 6, in one embodiment, a method 600 for containerization according to the inventive subject matter comprises deploying one or more initial container images 602, each initial container image associated with a startup script, a pre-service script and post-service script. The startup script is executed for each initial container image 604, comprising (at 606) copying configuration information for the initial container image into a volume 607, and (at 608) generating a marker file 609 for the initial container image. If another initial container image exists (610), then steps 602, 604, 606, 608 are repeated for the next initial container image. If no further initial image containers exist (610), then a main container image is deployed 612.

The main container image is associated with a startup script which is executed (at 614) comprising (at 616) copying the configuration information from the volume 607 to a local system 617 (as denoted by "B"), and (at 618) executing the main container. The pre-service script for each initial container image is executed 620, which is repeated for each initial container image (as controlled at 622). The main container is configured (at 624) and a main service is started (at 626). The post-service script for each initial container image is executed 628, which is repeated for each initial container image (as controlled at 630).

In a further embodiment, in a restart of the application service, if the marker file 609 exists (as determined at 602A) then the method proceeds to pre-service script execution 620 (as denoted by "A") and re-executes the pre-service script for each initial container image. The main container is re-configured 624 and the application service is restarted 626.

In an upgrade of the application service, method 600 further comprises, for each initial container image, deleting the configuration information (at 606A) and copying the upgraded configuration information to the volume 607. Also, the marker file is deleted (at 608A) and an upgraded marker file 609 is generated. At 616A, the configuration information is deleted from the local system 617, and the upgraded configuration information is copied from the volume 607 to the local system 617.

In yet another embodiment, the method 600 further comprises, at 632, executing a variable script associated with each initial container image and executing an environment script associated with each initial container image (as controlled at 634). The variables script ensures that initial container images and main container image may be deployed properly, and the environment script ensures proper environment settings are setup. Non-limiting examples of variable script functions include setting the path for the volume 607, sub-paths for copying the configuration information, as well as defining the names for the initial container images. Non-limiting examples of environment script functions include the definition of environment variables needed for the scripts. In further embodiments, the variable script and the environment script are defined in ".yaml" file format, which is human readable and therefore effective for defining variables and issuing commands.

In still another embodiment, method 600, prior to deploying the main container (612), ensures that the startup script for the initial container image has terminated (as controlled at 610A). This ensures that the initial container images are pre-built and ready at main container deployment time, including the definition of variables, environment settings, configuration information, marker files, and other definitions for the initial container images.

It should be known that the inventive subject matter may be applied using a variety of container providers, such as Docker, Amazon Web Services, Linux Containers, Java Containers, Hyper-V Containers and Windows Server Containers. Furthermore, a variety of applications exist for packaging and deploying container applications, such as Helm, which may be used to deploy container applications to various environments, such as Kubernetes.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method of containerization, comprising:
deploying an initial container image, the initial container image associated with a startup script, a pre-service script and post-service script, comprising:
   executing the startup script associated with the initial container image, the executing comprising:
      copying configuration information for the initial container image into a volume; and
      generating a marker file for the initial container image;
deploying a main container image, the main container image associated with a startup script, comprising:
   executing the startup script associated with the main container image, the executing comprising:
      copying the configuration information from the volume to a local system; and
executing the main container, comprising:
   executing the pre-service script associated with the initial container image;
   configuring the main container;
   executing a main service; and
   executing the post-service script associated with the initial container image.

2. The method of claim 1, further comprising:
re-executing the startup script associated with the initial container image, comprising:
   identifying that the marker file has been generated; and
re-executing the main container, comprising:
   based on the identifying of the marker file, re-executing the pre-service script associated with the initial container image and re-executing the main service.

3. The method of claim 1, further comprising:
executing an updated startup script associated with the initial container image, comprising:
   deleting from the volume the customization information for the initial container image;
   copying upgraded customization information for the initial container image into the volume;
   deleting the marker file;
   generating a new marker file; and
re-executing the main container, comprises:
   re-executing the startup script associated with the main container image, comprising:
      deleting the configuration information from the local system; and
      copying the upgraded configuration information from the volume to the local system;
   re-executing the pre-service script associated with the initial container image;
   re-executing the main service; and
   re-executing the post-service script associated with the initial container image.

4. The method of claim 1, wherein the initial container image is a plurality of initial container images and:
deploying the initial container image comprises, deploying each of the initial container images, comprising:
   executing the startup script for each associated initial container image comprising:
      copying the configuration information for each initial container image into the volume; and
      generating a marker file for each initial container image; and executing pre-service script associated with the initial container image further comprises:
executing the pre-service script for each associated initial container image; and
executing the post-service script associated with the initial container image further comprises:
executing the post-service script for each associated initial container image.

5. The method of claim 1, wherein deploying the main container image further comprises:
executing a variable script associated with the initial container image; and
executing an environment script associated with the initial container image.

6. The method of claim 1, further comprising:
prior to deploying the main container, ensuring that the startup script for the initial container image has terminated.

7. A system for containerization, comprising:
a processor;
a non-transitory computer-readable medium; and
stored instructions translatable by the processor for executing:
deploying an initial container image, the initial container image associated with a startup script, a pre-service script and post-service script, comprising:
executing the startup script associated with the initial container image, the executing comprising:
copying configuration information for the initial container image into a volume; and
generating a marker file for the initial container image;
deploying a main container image, the main container image associated with a startup script, comprising:
executing the startup script associated with the main container image, the executing comprising:
copying the configuration information from the volume to a local system; and
executing the main container, comprising:
executing the pre-service script associated with the initial container image;
configuring the main container;
executing a main service; and
executing the post-service script associated with the initial container image.

8. The system of claim 7, wherein the stored instructions further execute:
re-executing the startup script associated with the initial container image, comprising:
identifying that the marker file has been generated; and
re-executing the main container, comprising:
based on the identifying of the marker file, re-executing the pre-service script associated with the initial container image and re-executing the main service.

9. The system of claim 7, wherein the stored instructions further execute:
executing an updated startup script associated with the initial container image, comprising:
deleting from the volume the customization information for the initial container image;
copying upgraded customization information for the initial container image into the volume;
deleting the marker file;
generating a new marker file; and
re-executing the main container, comprises:
re-executing the startup script associated with the main container image, comprising:
deleting the configuration information from the local system;
copying the upgraded configuration information from the volume to the local system;
re-executing the pre-service script associated with the initial container image;
re-executing the main service; and
re-executing the post-service script associated with the initial container image.

10. The system of claim 7, wherein the initial container image is a plurality of initial container images and:
deploying the initial container image comprises, deploying each of the initial container images, comprising:
executing the startup script for each associated initial container image comprising:
copying the configuration information for each initial container image into the volume; and
generating a marker file for each initial container image; and
executing pre-service script associated with the initial container image further comprises:
executing the pre-service script for each associated initial container image; and
executing the post-service script associated with the initial container image further comprises:
executing the post-service script for each associated initial container image.

11. The system of claim 7, wherein deploying the main container image further comprises:
executing a variable script associated with the initial container image; and
executing an environment script associated with the initial container image.

12. The system of claim 7, wherein the stored instructions further execute:
prior to deploying the main container, ensuring that the startup script for the initial container image has terminated.

13. A computer programming product comprising a non-transitory computer-readable medium storing instructions for containerization, the instructions translatable by a processor for:
deploying an initial container image, the initial container image associated with a startup script, a pre-service script and post-service script, comprising:
executing the startup script associated with the initial container image, the executing comprising:
copying configuration information for the initial container image into a volume; and
generating a marker file for the initial container image;
deploying a main container image, the main container image associated with a startup script, comprising:
executing the startup script associated with the main container image, the executing comprising:
copying the configuration information from the volume to a local system; and
executing the main container, comprising:
executing the pre-service script associated with the initial container image;
configuring the main container;
executing a main service; and
executing the post-service script associated with the initial container image.

14. The computer programming product of claim 13, the instructions further for:

re-executing the startup script associated with the initial container image, comprising:
identifying that the marker file has been generated; and
re-executing the main container, comprising:
based on the identifying of the marker file, re-executing the pre-service script associated with the initial container image and re-executing the main service.

15. The computer programming product of claim 13, the instructions further for:
executing an updated startup script associated with the initial container image, comprising:
deleting from the volume the customization information for the initial container image;
copying upgraded customization information for the initial container image into the volume;
deleting the marker file;
generating a new marker file; and
re-executing the main container, comprising:
re-executing the startup script associated with the main container image, comprising:
deleting the configuration information from the local system;
copying the upgraded configuration information from the volume to the local system;
re-executing the pre-service script associated with the initial container image;
re-executing the main service;
re-executing the post-service script associated with the initial container image.

16. The computer programming product of claim 13, wherein the initial container image is a plurality of initial container images and:
deploying the initial container image comprises, deploying each of the initial container images, comprising:
executing the startup script for each associated initial container image comprising:
copying the configuration information for each initial container image into the volume; and
generating a marker file for each initial container image; and
executing pre-service script associated with the initial container image further comprises:
executing the pre-service script for each associated initial container image; and
executing the post-service script associated with the initial container image further comprises:
executing the post-service script for each associated initial container image.

17. The computer programming product of claim 13, wherein deploying the main container image further comprises:
executing a variable script associated with the initial container image; and
executing an environment script associated with the initial container image.

18. The computer programming product of claim 13, wherein the stored instructions further execute:
prior to deploying the main container, ensuring that the startup script for the initial container image has terminated.

* * * * *